US009445310B2

(12) United States Patent
Aoyagi et al.

(10) Patent No.: US 9,445,310 B2
(45) Date of Patent: Sep. 13, 2016

(54) MOBILE COMMUNICATION SYSTEM, NETWORK DEVICE, AND MOBILE COMMUNICATION METHOD

(75) Inventors: Kenichiro Aoyagi, Yokosuka (JP); Yuichiro Nakamura, Yokosuka (JP); Hideyuki Matsutani, Yokohama (JP); Mikio Iwamura, Tokyo (JP); Takahiro Hayashi, Yokosuka (JP); Kazunori Obata, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 498 days.

(21) Appl. No.: 13/578,204

(22) PCT Filed: Jul. 2, 2010

(86) PCT No.: PCT/JP2010/061353
§ 371 (c)(1),
(2), (4) Date: Oct. 16, 2012

(87) PCT Pub. No.: WO2011/099178
PCT Pub. Date: Aug. 18, 2011

(65) Prior Publication Data
US 2013/0028187 A1    Jan. 31, 2013

(30) Foreign Application Priority Data

Feb. 9, 2010    (JP) .................................. 2010-026700

(51) Int. Cl.
*H04W 4/00*    (2009.01)
*H04W 36/00*    (2009.01)
(Continued)

(52) U.S. Cl.
CPC ......... *H04W 36/0005* (2013.01); *H04W 52/02* (2013.01); *H04W 80/04* (2013.01); *H04W 36/0022* (2013.01); *H04W 36/28* (2013.01); *H04W 76/007* (2013.01)

(58) Field of Classification Search
USPC ....................................................... 370/331
See application file for complete search history.

(56) References Cited

U.S. PATENT DOCUMENTS 7,764,652 B2 *   7/2010  Wu ................................ 370/331
7,957,348 B1 *   6/2011  Gallagher et al. ............ 370/331
(Continued)

FOREIGN PATENT DOCUMENTS

CN    101553039 A     10/2009
EP       2249605 A1 *  11/2010 ............ H04W 40/24
(Continued)

OTHER PUBLICATIONS

Official Action issued in counterpart Australian Patent Application No. 2010345929 issued on Nov. 20, 2013 (3 pages).
(Continued)

*Primary Examiner* — Phuongchau Ba Nguyen
(74) *Attorney, Agent, or Firm* — Osha Liang LLP

(57) ABSTRACT

During a transition procedure from a first communication system to a second communication system, when the priority of a second communication call, whose setup is requested, is the first priority, the second communication system does not set up the bearer of a first communication call between the second communication system and the mobile communication terminal, and notifies the first communication system that the setup of the first communication is not possible, but the setup of the second communication call is possible. When notified that the setup of the first communication is not possible, but the setup of the second communication call is possible, the first communication system aborts the handover procedure, and instructs the mobile communication terminal to switch to the second communication system by another procedure.

8 Claims, 5 Drawing Sheets

(51) Int. Cl.
*H04W 52/02* (2009.01)
*H04W 80/04* (2009.01)
*H04W 36/28* (2009.01)
*H04W 76/00* (2009.01)

(56) References Cited

U.S. PATENT DOCUMENTS

| | | | |
|---|---|---|---|
| 8,611,334 B2* | 12/2013 | Naqvi | 370/351 |
| 8,885,599 B2* | 11/2014 | Rexhepi et al. | 370/331 |
| 8,976,760 B2* | 3/2015 | Aoyagi et al. | 370/331 |
| 2005/0003819 A1* | 1/2005 | Wu | 455/436 |
| 2005/0208948 A1* | 9/2005 | Hori et al. | 455/452.1 |
| 2006/0058031 A1* | 3/2006 | Nemoto | 455/436 |
| 2006/0239229 A1* | 10/2006 | Marinescu et al. | 370/331 |
| 2007/0249355 A1* | 10/2007 | Kang et al. | 455/439 |
| 2008/0080428 A1* | 4/2008 | Jappila et al. | 370/331 |
| 2009/0238143 A1* | 9/2009 | Mukherjee et al. | 370/331 |
| 2009/0296660 A1* | 12/2009 | Weng | 370/332 |
| 2010/0113010 A1* | 5/2010 | Tenny et al. | 455/423 |
| 2010/0202413 A1* | 8/2010 | Vikberg et al. | 370/332 |
| 2010/0296484 A1* | 11/2010 | Wu | H04W 36/0022 370/331 |
| 2011/0009121 A1* | 1/2011 | Yu et al. | 455/439 |
| 2011/0013623 A1* | 1/2011 | Hu et al. | 370/355 |
| 2011/0090873 A1* | 4/2011 | Lee et al. | 370/332 |
| 2011/0216645 A1* | 9/2011 | Song et al. | 370/216 |
| 2013/0028187 A1* | 1/2013 | Aoyagi et al. | 370/328 |

FOREIGN PATENT DOCUMENTS

| | | |
|---|---|---|
| JP | 2008-535352 A | 8/2008 |
| WO | 2006/103547 A1 | 10/2006 |

OTHER PUBLICATIONS

Office Action issued in Korean Patent Application No. 10-2012-7021480, mailing date Jan. 16, 2014, with English translation thereof (6 pages).
3GPP TS 23.272 V9.2.0; "3rd Generation Partnership Project; Technical Specification Group Services and System Aspects; Circuit Switched Fallback in Evolved Packet System; Stage 2 (Release 9)"; Dec. 2009 (64 pages).
NTT Docomo, Inc., "Redirection enhancements to UTRAN," 3GPP TSG-RAN WG2 #68bis; Tdoc R2-100528; Jan. 18-22, 2010 (2 pages).
3GPP TS 25.331 V9.1.0, "3rd Generation Partnership Project; Technical Specification Group Radio Access Network; Radio Resource Control (RRC); Protocol Specification (Release 9)," Dec. 2009 (1760 pages).
3GPP TS 36.331 v9.1.0, "3rd Generation Partnership Project; Technical Specification Group Radio Access Network; Evolved Universal Terrestrial Radio Access (E-UTRA) Radio Resource Control (RRC); Protocol specification (Release 9)," Dec. 2009 (232 pages).
3GPP TS 25.413 V9.1.0, "3rd Generation Partnership Project; Technical Specification Group Radio Access Network; UTRAN lu interface Radio Access Network Application Part (RANAP) signalling (Release 9)," Dec. 2009 (401 pages).
3GPP TS 36.413 V9.1.0, "3rd Generation Partnership Project; Technical Specification Group Radio Access Network; Evolved Universal Terrestrial Radio Access Network (E-UTRAN); S1 Application Protocol (S1AP) (Release 9)," Dec. 2009 (236 pages).
Office Action mailed Sep. 21, 2010 in corresponding Japanese Application No. 2010-026700, with English translation (5 pages).
Office Action mailed May 24, 2011 in corresponding Japanese Application No. 2010-026700, with English translation (5 pages).
International Search Report issued in PCT/JP2010/061353, mailed on Sep. 21, 2010, with translation (2 pages).
Office Action issued in Chinese Application No. 201080063473.6, mailed on Jun. 13, 2014 (21 pages).
Office Action in corresponding Chinese Patent Application No. 201080063473.6 dated Feb. 15, 2015, with translation (22 pages).
Office Action in corresponding Chinese Patent Application No. 201080063473.6 dated Sep. 8, 2015 (20 pages).

* cited by examiner

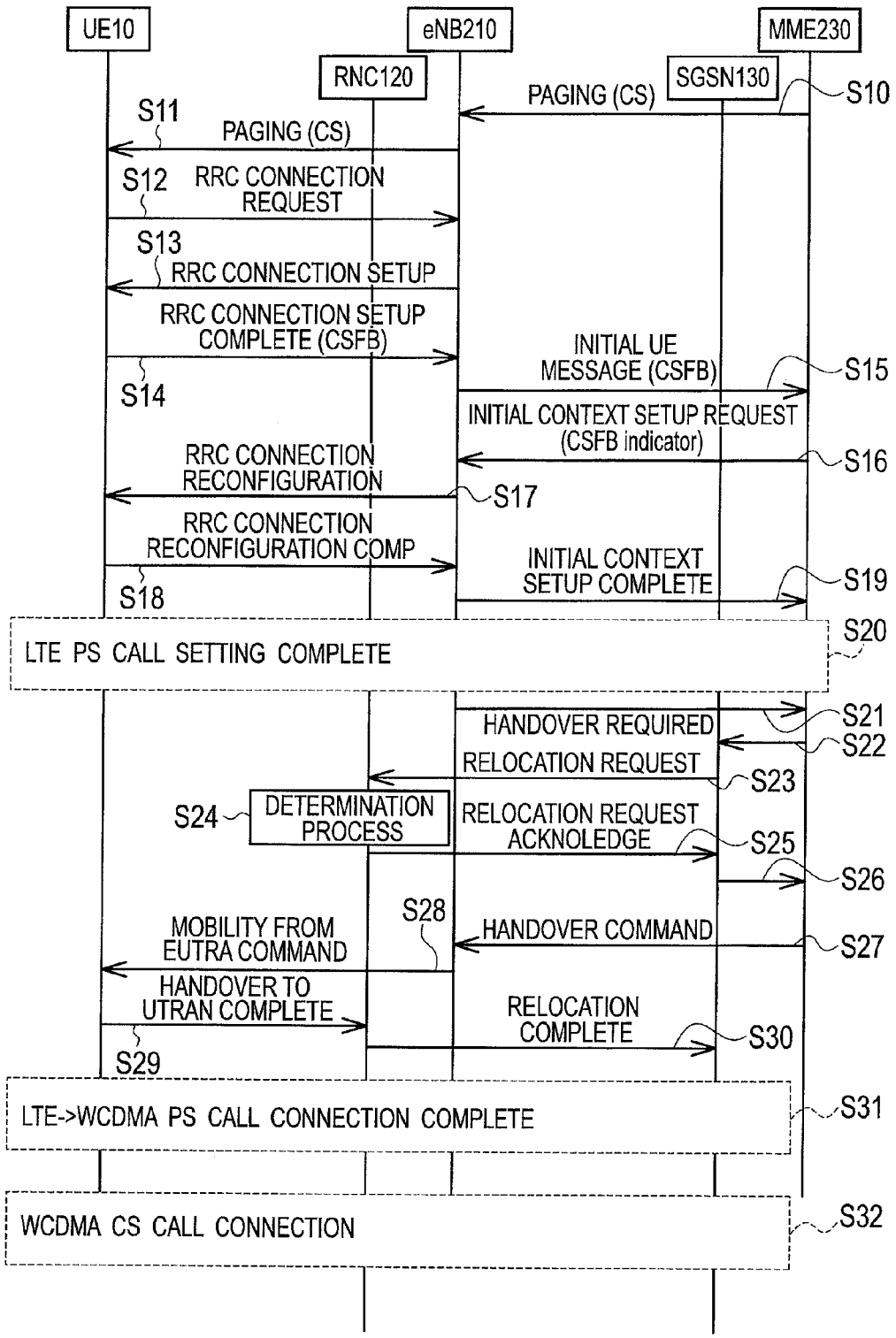

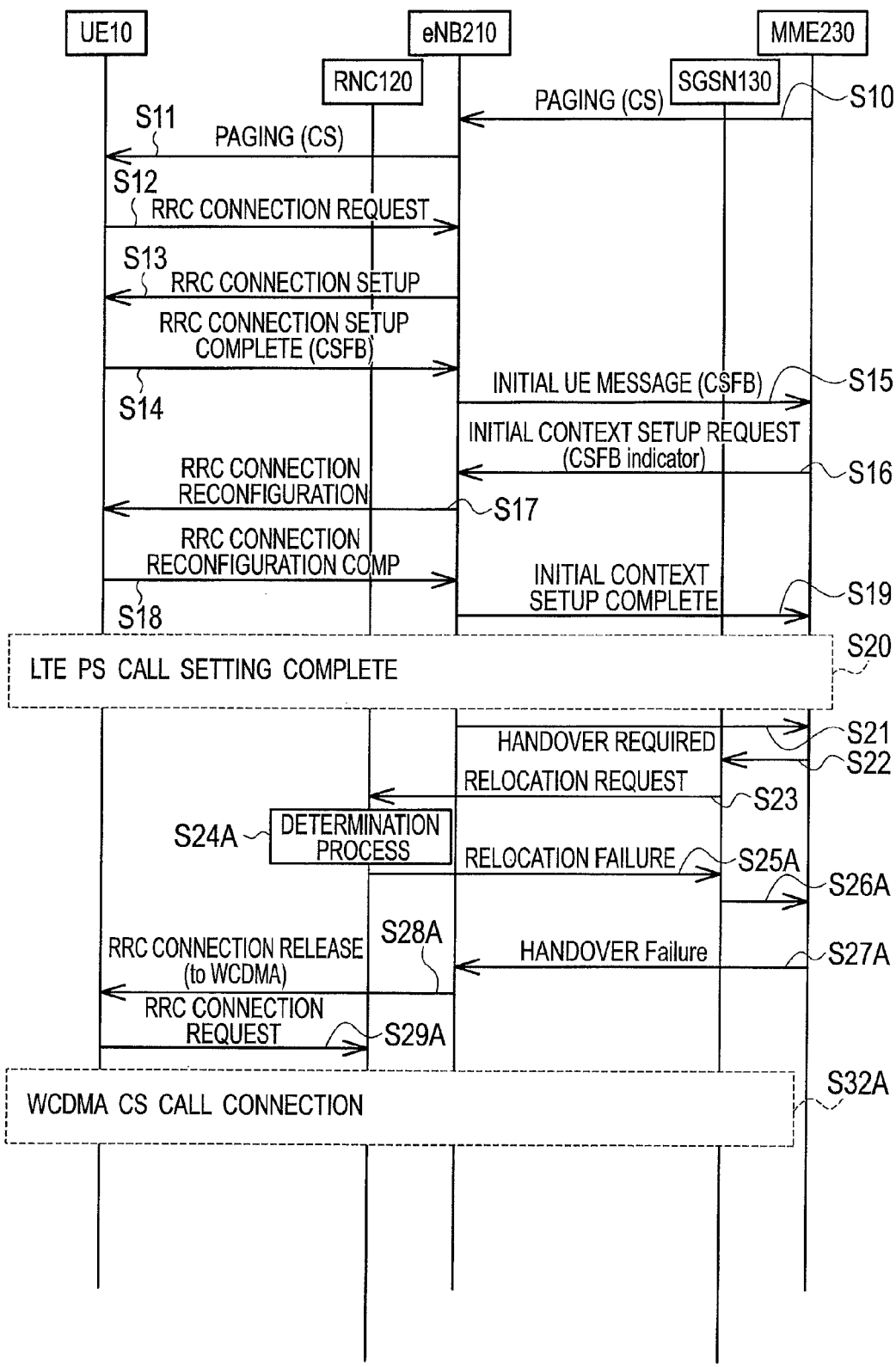

MOBILE COMMUNICATION SYSTEM, NETWORK DEVICE, AND MOBILE COMMUNICATION METHOD

TECHNICAL FIELD

The present invention relates to a mobile communication system that includes a first communication system and a second communication system, a network device provided in the mobile communication system, and a mobile communication method applied to the mobile communication system.

BACKGROUND ART

In the recent years, a first communication system (first RAT (Radio Access Technology) that does not support CS (Circuit Switching) calls is known. The first communication system, for example, is an LTE (Long Term Evolution)-compatible communication system.

CS FALL BACK (hereinafter, referred to as CSFB) is known as a technique of controlling the incoming and outgoing of a CS call of a mobile communication terminal (UE) in such a first communication system (For example, Non Patent Literatures 1 to 5).

In the CSFB, the transition to a second communication system (second RAT) that supports CS calls is instructed to the mobile communication terminal (UE). A technique of performing an Inter-Rat handover of a PS (Packet-switching) call, which is set up in the first communication system, to the second communication system, (hereinafter, referred to as a PS handover) is known as a method of transition to the second communication system. In the PS handover, after a PS call is set up in the second communication system, a CS call is set up in the second communication system.

Specifically, during the PS handover, when the mobile communication terminal is in an idle state in the first communication system, after the setup of the PS call between the mobile communication terminal and the first communication system, the PS call set up in the first communication system is carried over to the second communication system.

Alternatively, during the PS handover, when the mobile communication terminal is in the connected state in the first communication system, a PS call set up between the mobile communication terminal and the first communication system is carried over to the second communication system.

Furthermore, the PS handover is considered to be advantageous due to the fact that particularly when PS communication is being performed in the first communication system, the mobile communication terminal can be connected to the second communication system without disrupting the PS communication, by carrying over the PS calls to the second communication system.

SUMMARY OF INVENTION

Technical Problem

Normal voice calls and emergency calls are considered to be CS calls. In the aforementioned technique, due to the fact that the type of the CS calls that may be set up after an Inter-Rat handover cannot be identified at the time of execution of the Inter-Rat handover in the second communication system, for example, in the case of a disaster or the like, when PKT resources of the second communication system become insufficient as a result of concentration of access to the disaster message board, the PS calls are not set up in the second communication system, and the Inter-Rat handover fails. That is, even when a CS call is an emergency call, the Inter-Rat handover may fail, the subsequent CS calls may fail, and setup of the subsequent CS calls may be delayed.

Therefore, the present invention has been achieved to resolve the aforementioned problem, and an object thereof is to provide a mobile communication system, a network device, and a mobile communication method, by which, when the setup of a second communication call (for example, a CS call) is requested in a first communication system that does not support the second communication call, the transition from the first communication system to a second communication system that supports the second communication call can be performed appropriately.

Solution to Problem

A mobile communication system according to a first characteristic includes a first communication system that supports a first communication call and does not support a second communication call, and a second communication system that supports both the first communication call and the second communication call. The mobile communication system is configured to perform a handover procedure by which, when the setup of a second communication call is requested in the first communication system, the bearer of the first communication call set up between the first communication system and the mobile communication terminal is switched by the bearer of the first communication call set up between the second communication system and the mobile communication terminal. During the handover procedure, the second communication system identifies the priority of the second communication call whose setup is requested. When the priority of the second communication call, whose setup is requested, is the first priority, the second communication system does not set up the bearer of the first communication call between the second communication system and the mobile communication terminal, and notifies the first communication system that the setup of the first communication is not possible, but the setup of the second communication call is possible. When notified that the setup of the first communication is not possible, but the setup of the second communication call is possible, the first communication system aborts the handover procedure, and instructs the mobile communication terminal to switch to the second communication system by another procedure.

In the first characteristic, during the handover procedure, the first communication system notifies the second communication system of the priority of the second communication call whose setup is requested.

A network device according to a second characteristic is provided in the first communication system of a mobile communication system including the first communication system that supports a first communication call and does not support a second communication call, and a second communication system that supports both the first communication call and the second communication call. The mobile communication system is configured to perform a handover procedure by which, when the setup of a second communication call is requested in the first communication system, the bearer of the first communication call set up between the first communication system and the mobile communication terminal is switched to the bearer of the first communication call set up between the second communication system and the mobile communication terminal. The network device includes a reception unit configured to receive a notification from the first communication system that the setup of the first communication is not possible, but the setup of the second communication call is possible, during the handover procedure, and an instruction unit configured to abort the handover procedure and instruct the mobile communication terminal to switch to the second communication system by another procedure, when notified that the setup of the first communication is not possible, but the setup of the second communication call is possible.

A network device according to a third characteristic is provided in a first communication system of a mobile communication system including the first communication system that supports a first communication call and does not support a second communication call, and a second communication system that supports both the first communication call and the second communication call. The mobile communication system is configured to perform a handover procedure by which, when the setup of a second communication call is requested in the first communication system, the bearer of the first communication call set up between the first communication system and the mobile communication terminal is switched to the bearer of the first communication call set up between the second communication system and the mobile communication terminal. The network device includes an instruction unit configured to abort the handover procedure and instruct the mobile communication terminal to switch to the second communication system by another procedure, when the priority of the second communication call, whose setup is requested, is the first priority.

A network device according to the third characteristic is provided in a second communication system of a mobile communication system including a first communication system that supports a first communication call and does not support a second communication call, and the second communication system that supports both the first communication call and the second communication call. The mobile communication system is configured to perform a handover procedure by which, when the setup of a second communication call is requested in the first communication system, the bearer of the first communication call set up between the first communication system and the mobile communication terminal is switched to the bearer of the first communication call set up between the second communication system and the mobile communication terminal. The network device includes an identification unit configured to identify the priority of the second communication call whose setup is requested in the handover procedure, and a notification unit configured such that when the priority of the second communication call, whose setup is requested, is the first priority, the notification unit does not set up the bearer of the first communication call between the second communication system and the mobile communication terminal, and notifies the first communication system that the setup of the first communication is not possible, but the setup of the second communication call is possible.

A mobile communication method according to the third characteristic is applied to a mobile communication system including a first communication system that supports a first communication call and does not support a second communication call, and a second communication system that supports both the first communication call and the second communication call. The mobile communication system is configured to perform a handover procedure by which, when the setup of a second communication call is requested in the first communication system, the bearer of the first communication call set up between the first communication system and the mobile communication terminal is switched to the bearer of the first communication call set up between the second communication system and the mobile communication terminal. The mobile communication method includes a step of identifying, by the second communication system, the priority of the second communication call, whose setup is requested, in a transition procedure from the first communication system to the second communication system, a step of notifying, by the second communication system, to the first communication system, that the setup of the first communication is not possible, but the setup of the second communication call is possible, without setting up the bearer of the first communication call between the second communication system and the mobile communication terminal, when the priority of the second communication call, whose setup is requested, is the first priority, and a step of instructing the mobile communication terminal, by the first communication system, to abort the handover procedure and switch to the second communication system by another procedure, when notified that the setup of the first communication is not possible, but the setup of the second communication call is possible.

Advantageous Effects of Invention

According to the present invention, it is possible to provide a mobile communication system, a network device, and a mobile communication method by which, when the setup of a second communication call (for example, a CS call) is requested in a first communication system that does not support the second communication call, the transition from the first communication system to a second communication system that supports the second communication call can be performed appropriately.

BRIEF DESCRIPTION OF DRAWINGS

FIG. 4 is a sequence diagram illustrating an operation of the mobile communication system 100 according to the first embodiment.

FIG. 5 is a sequence diagram illustrating an operation of the mobile communication system 100 according to the first embodiment.

DESCRIPTION OF EMBODIMENTS

Figure 1:
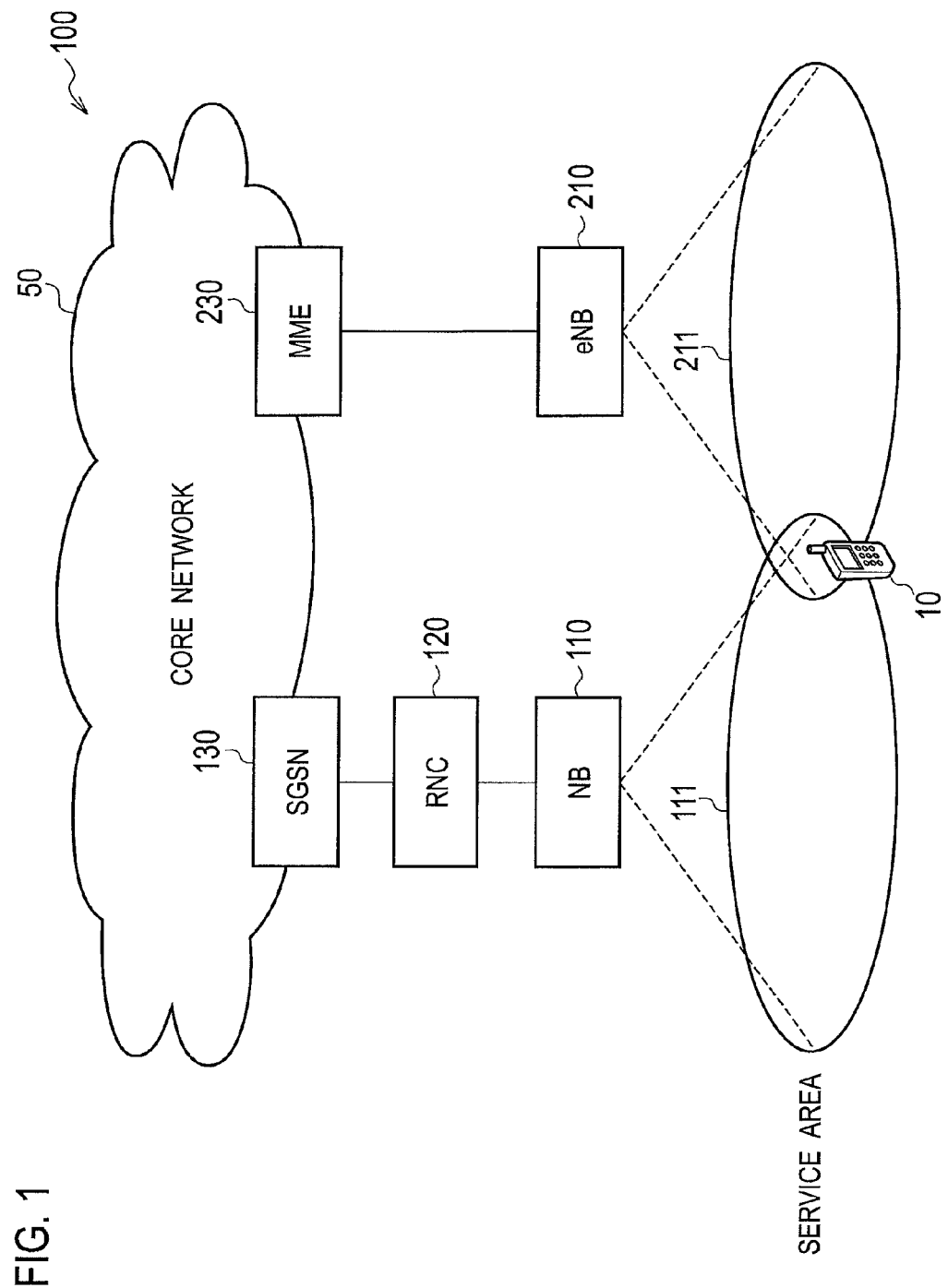
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

However, it should be noted that the drawings are schematic and ratios of respective dimensions and the like are different from actual ones. Accordingly, specific dimensions should be determined in consideration of the explanation below. Of course, among the drawings, the dimensional relationship and the ratio may be different.

Overview of Embodiments

The mobile communication system according to the embodiment includes a first communication system that supports a first communication call and does not support a second communication call, and a second communication system that supports both the first communication call and the second communication call. The mobile communication system is configured to perform a handover procedure (PS handover) by which, when the setup of a second communication call is requested in the first communication system, the bearer of the first communication call set up between the first communication system and the mobile communication terminal is switched to the bearer of the first communication call set up between the second communication system and the mobile communication terminal.

During the handover procedure (PS handover), the second communication system identifies the priority of the second communication call whose setup is requested. When the priority of the second communication call, whose setup is requested, is the first priority, the second communication system does not set up the bearer of the first communication call between the second communication system and the mobile communication terminal, and notifies the first communication system that the setup of the first communication is not possible, but the setup of the second communication call is possible. When notified that the first communication is not possible, but the setup of the second communication call is possible, the first communication system aborts the handover procedure, and instructs the mobile communication terminal to switch to the second communication system by another procedure.

Note that the other procedure includes, for example, Redirection, CCO (Cell Change Order), and SRVCC (Single Radio Voice Call Continuity).

Thus, when notified that the setup of the first communication is not possible, but the setup of the second communication call is possible, the handover procedure is aborted, and transition to the second communication system is performed by another procedure, and the second communication call, whose setup is requested, is set up between the second communication system and the mobile communication terminal.

Therefore, by starting another procedure, the first communication system can set up the second communication call between the second communication system and the mobile communication terminal, without being concerned about the failure of the PS handover due to the shortage of PKT resources, for example.

First Embodiment (Configuration of the Mobile Communication System)

Hereinafter, the configuration of the mobile communication system according to a first embodiment will be described with reference to the accompanying drawings. FIG. 1 is a diagram illustrating the mobile communication system 100 according to the first embodiment.

As illustrated in FIG. 1, the mobile communication system 100 includes a communication terminal device 10 (hereinafter, referred to as UE 10) and a core network 50. Furthermore, the mobile communication system 100 includes a first communication system and a second communication system.

The first communication system, for example, is an LTE (Long Term Evolution)-compatible communication system. The first communication system, for example, includes a base station 210 (hereinafter, referred to as eNB 210) and MME 230. In addition, in the first communication system, a first RAT (EUTRAN; Evolved Universal Terrestrial Access Network) is used.

The second communication system, for example, is a WCDMA (Wideband Code Division Multiple Access)-compatible communication system. The second communication system includes a base station 110 (hereinafter, referred to as NB 110), RNC 120, and SGSN 130. In addition, in the second communication system, a second RAT (UTRAN; Universal Terrestrial Access Network) is used.

The first communication system supports a first communication call (for example, a PS call), and does not support a second communication call (for example, a CS call). Furthermore, the second communication system supports both the first communication call (for example, a PS call) and the second communication call (for example, a CS call).

Also, CS FALL BACK (hereinafter, referred to as CSFB) is known as a technique of controlling the incoming or outgoing of the second communication call of the UE 10 in the first communication system.

In the CSFB, the transition to the second communication system that supports the second communication call is instructed to the UE 10. A technique of performing an Inter-Rat handover of the first communication call (hereinafter, referred to as a PS handover), which is set up in the first communication system, to the second communication system, is considered as a method of transition to the second communication method.

In detail, during a PS handover, a new bearer of the first communication call is set up between the second communication system and the UE 10, and the bearer of the first communication call that is set up between the first communication system and the UE 10 is switched to the bearer of the first communication call set up between the second communication system and the UE 10. Following this, the second communication call is set up between the second communication system and the UE 10.

The UE 10 is a device (User Equipment) configured to communicate with the first communication system and the second communication system. For example, the UE 10 has a function of performing radio communication with the NB 110, and a function of performing radio communication with the eNB 210.

The NB 110, having a cell 111, is a device (NodeB) configured to perform radio communication with the UE 10 existing in the cell 111.

The RNC 120, connected to the NB 110, is a device (Radio Network Controller) configured to set up a radio connection (RRC Connection) with the UE 10 existing in the cell 111.

The SGSN 130 is a device (Serving GPRS Support Node) configured to perform packet switching in a packet switching domain. The SGSN 130 is provided in the core network 50. Although not illustrated in FIG. 1, a device (MSC; Mobile Switching Center) configured to perform circuit switching in a circuit switching domain may be provided in the core network 50.

The eNB 210, having a cell 211, is a device (evolved NodeB) configured to perform radio communication with the UE 10 existing in the cell 211.

The MME 230 is a device (Mobility Management Entity) configured to manage the mobility of the UE 10 having set up a radio connection with the eNB 210. The MME 230 is provided in the core network 50.

Furthermore, a cell must be understood as a function of performing radio communication with the UE 10. The cell may also be considered as a service area indicating a range communicable with the cell. A cell is identified based on the frequency used in the cell, the spreading code, or the time slot.

(Configuration of the Network Device)

Figure 2:
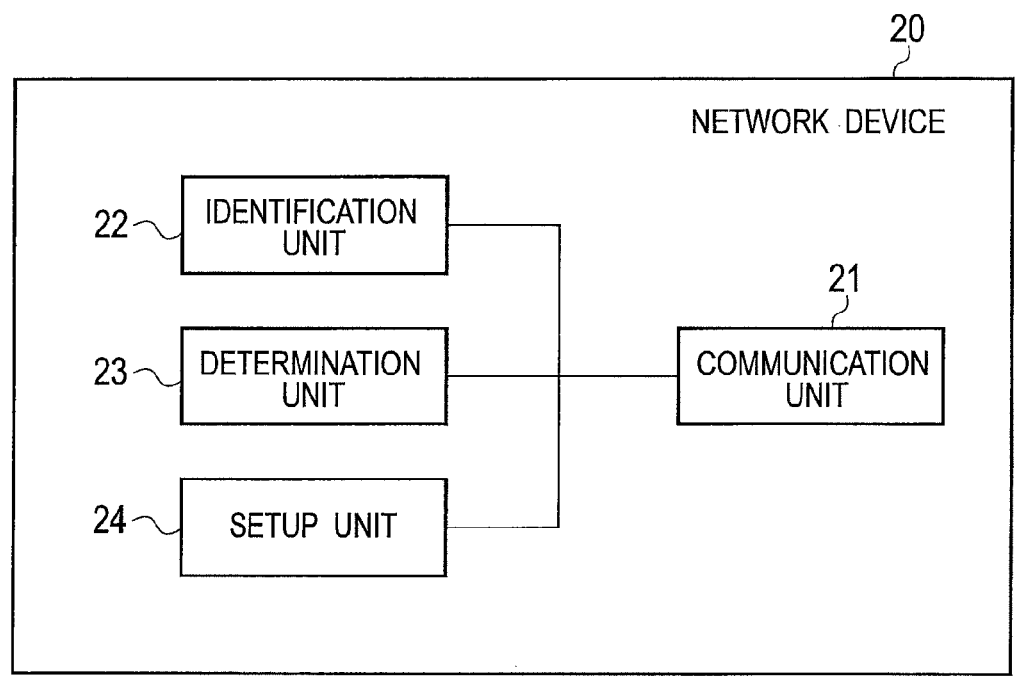
FIG. 2 is a block diagram illustrating a network device 20 according to the first embodiment.

Hereinafter, a configuration of the network device according to the first embodiment will be described with reference to the accompanying drawings. FIG. 2 is a diagram illustrating the network device 20 according to the first embodiment.

In the first embodiment, the network device 20 is provided in the second communication system. For example, the network device 20 is the RNC 120.

Furthermore, the first embodiment explains a case in which the procedure of a PS handover is started as a procedure of CSFB, when the setup of the second communication call is requested as a result of incoming or outgoing of the second communication call, in the first communication system. Hereinafter, mainly the functions of the network device 20 provided in the second communication system in such a case are explained.

As shown in FIG. 2, the network device 20 has a communication unit 21, an identification unit 22, a determination unit 23, and a setup unit 24.

The communication unit 21 is configured to communicate with the network device (for example, the eNB 210) provided in the first communication system. For example, the communication unit 21 receives the priority of the second communication call, whose setup is requested in the first communication system.

The priority of the second communication call includes, for example, the first priority, the second priority that is lower than the first priority, and the like. For example, the first priority is an information element for identifying an emergency call, and the second priority is an information element for identifying a normal voice call. Furthermore, the priority of the second communication call may be "Message Cause" that is included in S1AP.

The priority of the second communication call is notified from another network device (eNB 210 or MME 230) provided in the first communication system via the SGSN 130. For example, in the procedure of CSFB (PS handover), the eNB 210 sets the priority of the second communication call in a message (HANDOVER REQUIRED) requesting a PS handover from the first communication system to the second communication system. Such a message (HANDOVER REQUIRED) is transmitted from the eNB 210 to the MME 230. Alternatively, the MME 230 may set the priority of the second communication call in a message (HANDOVER REQUIRED) received from the eNB 210. Such a message (HANDOVER REQUIRED) is transmitted from the MME 230 to the RNC 120 via the SGSN 130.

The identification unit 22 identifies the priority of the second communication call, whose setup is requested in the first communication system. Specifically, the identification unit 22 identifies the priority of the second communication call, whose setup is requested, based on a message (for example, "RELOCATION REQUEST") received from another network device in the procedure of a PS handover.

The determination unit 23 is configured to determine whether or not the bearer of the first communication call is to be set up between the second communication system and the UE 10, based on the identifier of the priority of the second communication call identified by the identification unit 22.

The setup unit 24 sets up the bearer of the first communication call between the second communication system and the UE 10. Alternatively, the setup unit 24 is configured to set up the bearer of the second communication call between the second communication system and the UE 10.

Specifically, when the priority of the second communication call, whose setup is requested in the first communication system, is the first priority, the setup unit 24 does not set up the bearer of the first communication call between the second communication system and the UE 10. Additionally, the setup unit 24 instructs the communication unit 21 to notify the first communication system that the setup of the first communication is not possible, but the setup of the second communication call is possible.

For example, when the CS call according to CSFB is an emergency call, the setup unit 24 does not set up a PS bearer between the second communication system and the UE 10, and instructs the communication unit 21 to notify the first communication system that the setup of the PS bearer cannot be performed, but the setup of the CS bearer is possible.

On the other hand, when the priority of the second communication call, whose setup is requested in the first communication system, is the second priority, the setup unit 24 sets up the bearer of the first communication call between the second communication system and the UE 10.

For example, when the CS call according to CSFB is a normal voice call, the setup unit 24 sets a PS bearer between the second communication system and the UE 10.

(Configuration of the Network Device)

Figure 3:
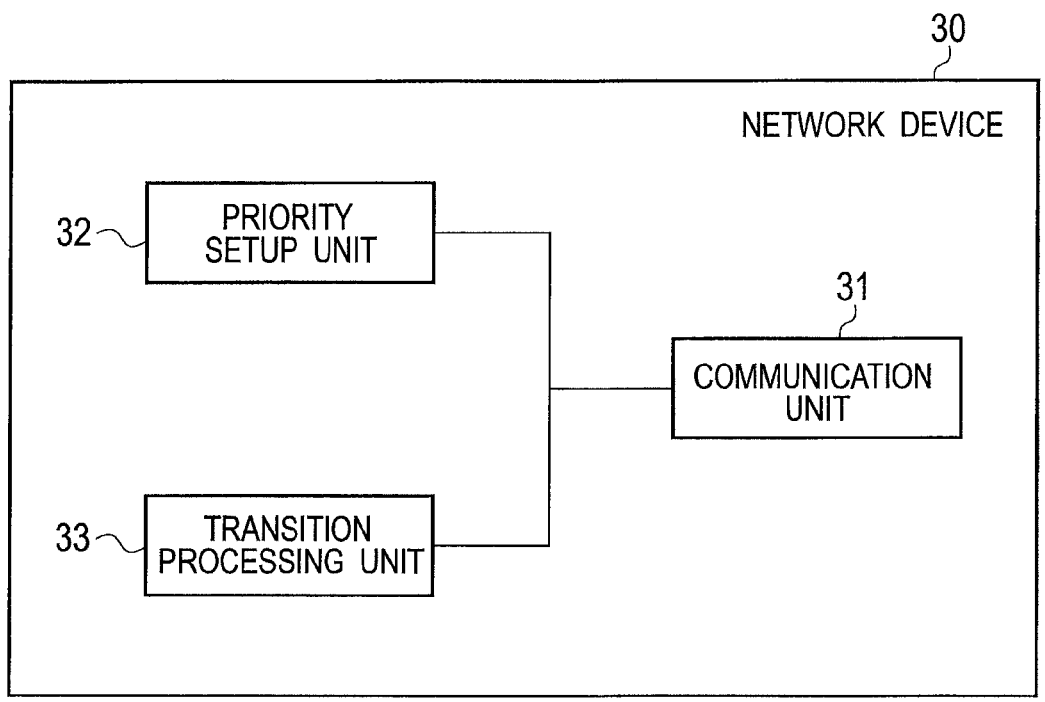
FIG. 3 is a block diagram illustrating a network device 30 according to the first embodiment.

Hereinafter, a configuration of the network device according to the first embodiment will be described with reference to the accompanying drawings. FIG. 3 is a diagram illustrating a network device 30 according to the first embodiment.

In the first embodiment, the network device 30 is provided in the first communication system. For example, the network device 30 is the eNB 210.

Furthermore, the first embodiment mainly explains the functions of the network device 30 provided in the first communication system, in a case in which the procedure of a PS handover is started as a procedure of CSFB.

As shown in FIG. 3, the network device 30 has a communication unit 31, a priority setup unit 32, and a transition processing unit 33.

The communication unit 31 communicates with the network device 20 (for example, the RNC 120) provided in the second communication system. For example, the communication unit 31 transmits the priority of the second communication call, whose setup is requested in the first communication system.

The communication unit 31 receives an incoming request (paging) to the UE 10, from an upper node (MME 230). Alternatively, the communication unit 31 receives an outgoing request (origination) from the UE 10, from the UE 10.

The priority setup unit 32 is configured to set the priority of the second communication call (for example, a CS call), whose setup is requested based on incoming or outgoing, in the first communication system.

Specifically, the priority setup unit 32 sets the priority of the second communication call depending on the type of the second communication call according to the incoming request or the outgoing request. For example, the priority setup unit 32 sets the priority of the second communication call, based on the "Paging Cause" included in the incoming request (Paging) received from the MME 230. The priority setup unit 32 sets the priority of the second communication call, based on the "Establishment Cause" included in a message (RRC CONNECTION REQUEST) requesting the setup of a radio connection.

For example, when the second communication call is an emergency call, the priority setup unit 32 sets the first priority. When the second communication call is a normal voice call, the priority setup unit 32 sets the second priority that is lower than the first priority.

The priority setup unit 32 sets the priority of the second communication call in a message (HANDOVER REQUIRED) requesting a PS handover from the first communication system to the second communication system, in the procedure of the PS handover.

The transition processing unit 33 controls the transition (CSFB) from the first communication system to the second communication system. Specifically, the transition processing unit 33 switches the method of CSFB based on the priority of the second communication call.

For example, when the priority of the second communication call is the first priority, the transition processing unit 33 aborts the PS handover, and starts another procedure (Redirection, CCO (Cell Change Order), and SRVCC (Single Radio Voice Call Continuity). Specifically, when notified that the setup of the PS bearer cannot be performed, but the setup of the CS bearer is possible, the transition processing unit 33 aborts the PS handover, and starts another procedure (Redirection, CCO (Cell Change Order), and SRVCC (Single Radio Voice Call Continuity). That is, the transition processing unit 33 instructs the UE 10 to transit to the second communication system by another procedure. In detail, the transition processing unit 33 instructs the transmission of such instruction information to the communication unit 31.

Furthermore, in addition to transition to the second communication system by another procedure, the transition processing unit 33 may instruct the UE 10 to set the second communication call, whose setup is requested, between the second communication system and the UE 10.

"Redirection" is a procedure of transiting the UE 10 to the second communication system after the UE 10 has been transited to the Idle state. During "Redirection", the UE 10 again tries the setup of the second communication system and the second communication call.

"CCO" is a procedure of transiting the UE 10 to the second communication system after the UE 10 has been transited to the Idle state. During "CCO", after setting up the second communication system and the first communication call, the UE 10 sets up the second communication system and the second communication call.

"SRVCC" is a procedure of transiting the UE 10 to the second communication system without transiting the UE 10 to the Idle state. During "SRVCC", the UE 10 switches the first communication call set up with the first communication system, to the second communication call set up with the second communication system.

When the priority of the second communication call is the second priority, the transition processing unit 33 continues the PS handover.

(Operation of Mobile Communication System)

Hereinafter, an operation of the mobile communication system according to the first embodiment will be described with reference to the accompanying drawings. FIG. 4 and FIG. 5 are sequence diagrams illustrating an operation of the mobile communication system 100 according to the first embodiment. A case in which the network device 20 is the RNC 120 is illustrated as an example.

Hereinafter, a case in which the procedure of a PS handover is started as a procedure of CSFB, when the setup of the second communication call is requested as a result of incoming of the second communication call, in the first communication system, will be explained. Furthermore, the first communication call is a PS call, and the second communication call is a CS call. The bearer of the first communication call is a PS bearer, and the bearer of the second communication call is a CS bearer. Furthermore, a case in which the first communication system is LTE and the second communication system is UMTS (WCDMA) is illustrated as an example.

Firstly, a case in which the setup of a CS bearer is requested as a result of incoming of a normal voice call (CS call), is explained with reference to FIG. 4.

As shown in FIG. 4, in step 10, the MME 230 notifies the eNB 210 of an incoming (Paging) to the UE 10. In step 11, the eNB 210 notifies the UE 10 of the incoming (Paging) to the UE 10.

In step 12, the UE 10 transmits a message (RRC CONNECTION REQUEST) requesting the setup of a radio connection of a PS call according to LTE, to the eNB 210.

In step 13, the eNB 210 transmits a message (RRC CONNECTION SETUP) for setting up a radio connection of the PS call according to LTE, to the UE 10.

In step 14, the UE 10 transmits a message (RRC CONNECTION SETUP COMPLETE) notifying the completion of setup of the radio connection of the PS call according to LTE, to the eNB 210. The UE 10 transmits an information element (CSFB Indicator) for identifying CSFB, to the eNB 210.

In step 15, the eNB 210 transmits a message (Initial UE Message) indicating that CSFB is necessary, to the MME 230.

In step 16, the MME 230 transmits a message (Initial Context SETUP REQUEST) requesting the setup of a PS call, to the eNB 210. The message (Initial Context SETUP REQUEST) includes the information element (CSFB Indicator) for identifying CSFB, and the capability of the UE 10 in WCDMA.

In step 17, the eNB 210 transmits a message (RRC CONNECTION RECONFIGURATION) notifying the configuration change of the radio connection, to the UE 10.

In step 18, the UE 10 transmits a message (RRC CONNECTION RECONFIGURATION COMP) notifying the completion of configuration change of the radio connection, to the eNB 210.

In step 19, the eNB 210 transmits a message (Initial Context SETUP COMPLETE) notifying the completion of setup of the PS call, to the MME 230.

In step 20, the setup of the PS call between the eNB 210 and the UE 10 is complete.

In step 21, the eNB 210 transmits a message (HANDOVER REQUIRED) requesting the start of a transition procedure (PS handover) from LTE to WCDMA, to the MME 230. For example, the eNB 210 sets the priority of the CS call whose setup is requested in LTE, in a message (HANDOVER REQUIRED).

In step 22, the MME 230 transfers the message (HANDOVER REQUIRED) to the SGSN 130.

In step 23, the SGSN 130 transmits a message (RELOCATION REQUEST) requesting the transition from LTE to WCDMA, to the RNC 120. The message (RELOCATION REQUEST) includes the priority of the CS call whose setup is requested in LTE.

In step 24, the RNC 120 determines whether or not to set the PS bearer, based on the priority of the CS call. In FIG. 4, because the CS call is a normal voice call, the RNC 120 determines that the PS bearer is to be set.

In step 25, the RNC 120 transmits a message (RELOCATION REQUEST ACKNOWLEDGE) notifying the receipt of a transition request from LTE to WCDMA, to the SGSN 130.

In step 26, the SGSN 130 transfers the message (RELOCATION REQUEST ACKNOWLEDGE) to the MME 230.

In step 27, the MME 230 transmits a message (HANDOVER COMMAND) requesting the transition from LTE to WCDMA, to the eNB 210.

In step 28, the eNB 210 transmits a message (MOBILITY FROM EUTRA COMMAND) requesting a PS handover from LTE to WCDMA, to the UE 10.

In step 29, the UE 10 transmits a message (HANDOVER TO UTRAN COMPLETE) notifying the completion of the PS handover from LTE to WCDMA, to the RNC 120.

In step 30, the RNC 120 transmits a message (RELOCATION COMPLETE) notifying the completion of transition from LTE to WCDMA, to the SGSN 130.

In step 31, the setup of the PS call between the RNC 120 and the UE 10 is complete. That is, the PS bearer set up between LTE and the UE 10 is switched to the PS bearer set up between WCDMA and the UE 10.

In step 32, a CS call is set up between the RNC 120 and the UE 10.

Secondly, a case in which the setup of a CS bearer is requested as a result of incoming of an emergency call (CS call), is explained with reference to FIG. 5. In FIG. 5, identical step numbers are assigned to processes identical to those of FIG. 4. Furthermore, the explanation of processes identical to those of FIG. 4 is omitted.

As shown in FIG. 5, in step 24A, the RNC 120 determines whether or not to set a PS bearer, based on the priority of the CS call. In FIG. 5, because the CS call is an emergency call, the RNC 120 determines that a PS bearer is not to be set.

In step 25A, the RNC 120 transmits a message (RELOCATION FAILURE) notifying the failure of transition from LTE to WCDMA, to the SGSN 130. Furthermore, the message (RELOCATION FAILURE) includes information indicating that the setup of a PS bearer cannot be performed, but the setup of a CS bearer is possible. For example, the message (RELOCATION FAILURE) includes the "cause" indicating the reason of failure of transition.

In step 26A, the SGSN 130 transfers the message (RELOCATION FAILURE) to the MME 230.

In step 27A, the MME 230 transmits a message (HANDOVER Failure) notifying the failure of the transition procedure (PS handover) from LTE to WCDMA, to the eNB 210.

In step 28A, the eNB 210 transmits a message (RRC CONNECTION RELEASE) instructing the release of the radio connection according to the PS call of LTE, to the UE 10. Furthermore, the message (RRC CONNECTION RELEASE) includes information instructing a connection to WCDMA. For example, the message (RRC CONNECTION RELEASE) includes "redirectedCarrierinfo" indicating the frequency of the transition destination, and "idleModeMobilityControlInfo" indicating the priority of the cell that needs to be re-selected. In detail, as an alternative to the PS handover, the UE 10 starts another procedure (Redirection, CCO (Cell Change Order), and SRVCC (Single Radio Voice Call Continuity).

In step 29A, the UE 10 transmits a message (RRC CONNECTION REQUEST) requesting the setup of a radio connection of the CS call according to WCDMA, to the eNB 210.

In step 32A, a CS call is set up between the RNC 120 and the UE 10.

(Operation and Effect)

In the embodiment, during the procedure of the PS handover, when the priority of the second communication call, whose setup is requested in the first communication system, is the first priority (for example, an emergency call), the RNC 120 does not set up the bearer of the first communication call between the second communication system and the mobile communication terminal, and notifies the eNB 210 that the setup of the bearer of the first communication call has failed.

When the eNB 210 is notified of the failure of the setup of the bearer of the first communication call, the eNB 210 aborts the PS handover, and instructs the UE 10 to set up the second communication call by another procedure (Redirection, CCO (Cell Change Order), and SRVCC (Single Radio Voice Call Continuity)) between the second communication system and the UE 10.

Therefore, by starting another procedure, the eNB 210 can set up the second communication call between the second communication system and the mobile communication terminal, without being concerned about the failure of the PS handover due to the shortage of PKT resources, for example.

Furthermore, when "Redirection" or "SRVCC" are used as the other procedures, the bearer of the first communication call (for example, the PS bearer) need not be set up in the first communication system, and therefore, the resources are used effectively.

Other Embodiments

The present invention is explained through the above embodiment, but it must not be assumed that this invention is limited by the statements and the drawings constituting a part of this disclosure. From this disclosure, various alternative embodiments, examples, and operational technologies will become apparent to those skilled in the art.

The first communication system and the second communication system are not restricted to communication systems corresponding to LTE and WCDMA, and may be other communication systems (for example, a communication system corresponding to WiMAX).

In the aforementioned FIG. 4 and FIG. 5, an example of incoming of the second communication call (CS call) is illustrated. However, the embodiment is not limited thereto. The embodiment can also be applied to outgoing of the second communication call (CS call).

In the aforementioned FIG. 4 and FIG. 5, a case in which the first communication call has not been set up in the first communication system is illustrated as an example. That is, in FIG. 4 and FIG. 5, a case in which the UE 10 is in the Idle state has been illustrated as an example. However, the embodiment is not limited thereto. The embodiment can also be applied to a case in which the UE 10 is in the Connected state. In such a case, the process of setting up the first communication call in the first communication system is omitted.

In the aforementioned embodiment, two types of second communication calls, that is, normal voice calls and emergency calls were illustrated as examples. However, the embodiment is not limited thereto. The embodiment can also be applied to a case in which the priority of the second communication call is three or above.

In the aforementioned embodiment, when the second communication call is an emergency call, the RNC 120 does not set up the bearer of the first communication call (for example, the PS bearer). However, the embodiment is not limited thereto. When the second communication call is an emergency call, the RNC 120 may set only DCCH without setting DTCH.

In the aforementioned embodiment, when notified that the setup of the first communication is not possible, but the setup of the second communication call is possible, the network device 30 (eNB 210) may abort the PS handover, and start another procedure (Redirection, CCO (Cell Change Order), and SRVCC (Single Radio Voice Call Continuity). However, the embodiment is not limited thereto. Specifically, when the priority of the first communication call, whose setup is requested, is the first priority (for example, an emergency call), the network device 30 (eNB 210) immediately aborts the PS handover, and instructs the UE 10 to transit to the second communication system by another procedure. In such a case, the transmission of "HANDOVER REQUIRED" to the second communication system can be omitted.

In the aforementioned embodiment, a case in which the network device 20 is the RNC 120 is illustrated as an example. However, the embodiment is not limited thereto. The network device 20 may be the SGSN 130. Furthermore, the network device 20 may be a home gateway (HNB-GW) configured to manage a specific cell (such as a femtocell, a CSG cell, or a home cell) in the second communication system.

In the aforementioned embodiment, a case in which the network device 30 is the eNB 210 is illustrated as an example. However, the embodiment is not limited thereto. The network device 30 may be the MME 230. Furthermore, the network device 30 may be a home gateway (HNB-GW) configured to manage a specific cell (such as a femtocell, a CSG cell, or a home cell) in the first communication system.

It is noted that the operation of the network device 20 or the network device 30 may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the network device 20 or the network device 30. Further, such a storage medium or a processor may be arranged, as a discrete component, in the network device 20 or the network device 30.

The invention claimed is:

1. A mobile communication system including a first communication system that supports a PS (Packet-switching) call and does not support a CS (Circuit Switching) call, and a second communication system that supports both the PS call and the CS call, wherein
the first communication system is configured to receive a request of the setup of the CS call; and
the first communication system is configured to notify the second communication system, when the setup of the CS call is requested, by a message requesting to switch a bearer of the PS call set up between the first communication system and a mobile communication terminal to a bearer of the PS call set up between the second communication system and the mobile communication terminal, of a priority of the CS call over another CS call, whose setup is requested.

2. The mobile communication system according to claim 1, wherein
the second communication system is configured such that when the priority of the CS call, whose setup is requested, is a predetermined priority, the second communication system does not set up the bearer of the PS call between the second communication system and the mobile communication terminal, and notifies the first communication system that the setup of the PS call is not possible, but the setup of the CS call is possible, and
the first communication system is configured such that when the notification that the setup of the PS call is not possible, but the setup of the CS call is possible, is performed, the first communication system aborts a procedure to switch the bearer of the PS call set up between the first communication system and the mobile communication terminal to the bearer of the PS call set up between the second communication system and the mobile communication terminal, and instructs the mobile communication terminal to switch to the second communication system by another procedure.

3. A network device provided with a mobile communication system including a first communication system that supports a PS (Packet-switching) call and does not support a CS (Circuit Switching) call, and a second communication system that supports both the PS call and the CS call, the network device comprising:
a communication unit is configured to receive a request of the setup of the CS call; and
a notification unit configured to notify the second communication system, when the setup of the CS call is requested in the first communication system, by a message requesting to switch a bearer of the PS call set up between the first communication system and a mobile communication terminal to a bearer of the PS call set up between the second communication system and the mobile communication terminal, of a priority of the CS call over another CS call, whose setup is requested.

4. The network device according to claim 3, comprising:
a reception unit configured to receive, by the message, that the setup of the PS call is not possible but the setup of the CS call is possible, from the second communication system; and
an instruction unit configured to, when notified that the setup of the PS call is not possible, but the setup of the CS call is possible, abort a procedure to switch the bearer of the PS call set up between the first communication system and the mobile communication terminal to the bearer of the PS call set up between the second communication system and the mobile communication terminal, when a priority of the CS call, whose setup is requested, is a predetermined priority, and instruct the mobile communication terminal to switch to the second communication system by another procedure.

5. A network device provided with a mobile communication system including a first communication system that supports a PS (Packet-switching) call and does not support a CS (Circuit Switching) call, and a second communication system that supports both the PS call and the CS call, the network device comprising:
a communication unit is configured to receive a request of the setup of the CS call; and
an instruction unit configured to, when the setup of the CS call is requested in the first communication system, by a message requesting to switch a bearer of the PS call set up between the first communication system and a mobile communication terminal to a bearer of the PS call set up between the second communication system and the mobile communication terminal, when a priority of the CS call, whose setup is requested, is a predetermined priority, abort a procedure to switch the bearer of the PS call set up between the first communication system and the mobile communication terminal to the bearer of the PS call set up between the second communication system and the mobile communication terminal, and instruct the mobile communication terminal to switch to the second communication system by another procedure.

6. A network device provided with a mobile communication system, comprising:
   a first communication system that supports a PS (Packet-switching) call and does not support a CS (Circuit Switching) call, and a second communication system that supports both the PS call and the CS call, the network device comprising an identification unit configured to, when the setup of the CS call is requested in the first communication system, by a message requesting to switch a bearer of the PS call set up between the first communication system and a mobile communication terminal to a bearer of the PS call set up between the second communication system and the mobile communication terminal, identify a priority of the CS call whose setup is requested; and
   a notification unit configured to notify to the first communication system that the setup of the PS call is not possible, but the setup of the CS call is possible, without setting up the bearer of the PS call between the second communication system and the mobile communication terminal, when the priority of the CS call, whose setup is requested, is a predetermined priority.

7. A mobile communication method used for a mobile communication system including a first communication system that supports a PS (Packet-switching) call and does not support a CS (Circuit Switching) call, and a second communication system that supports both the PS call and the CS call, the mobile communication method comprising:
   notifying, by the first communication system, when the setup of the CS call is requested in the first communication system, by a message requesting to switch a bearer of the PS call set up between the first communication system and a mobile communication terminal to a bearer of the PS call set up between the second communication system and the mobile communication terminal, the second communication system, of a priority of the CS call over another CS call, whose setup is requested.

8. The mobile communication method according to claim 7, further comprising:
   identifying, by the second communication system, the priority of the CS call whose setup is requested, in a transition procedure from the first communication system to the second communication system;
   notifying, by the second communication system, to the first communication system, that the setup of the PS call is not possible, but the setup of the CS call is possible, without setting up the bearer of the PS call between the second communication system and the mobile communication terminal, when the priority of the CS call, whose setup is requested, is a predetermined priority, and
   instructing the mobile communication terminal, by the first communication system, to abort a procedure to switch the bearer of the PS call set up between the first communication system and the mobile communication terminal to the bearer of the PS call set up between the second communication system and the mobile communication terminal, when notified that the setup of the PS call is not possible but the setup of the CS call is possible, and switch to the second communication system by another procedure.

* * * * *